(12) United States Patent
Hynds et al.

(10) Patent No.: US 7,171,122 B1
(45) Date of Patent: Jan. 30, 2007

(54) FIBEROPTIC DATA TELECOMMUNICATION SYSTEM ARCHITECTURE

(75) Inventors: John P. Hynds, Washougal, WA (US); Henning Ottsen, Sacramento, CA (US)

(73) Assignee: Wellhead Patent, LLC, Sacramento, CA (US)

( * ) Notice: Subject to any disclaimer, the term of this patent is extended or adjusted under 35 U.S.C. 154(b) by 775 days.

(21) Appl. No.: 10/251,909

(22) Filed: Sep. 19, 2002

(51) Int. Cl.
*H04J 14/00* (2006.01)

(52) U.S. Cl. .............. 398/70; 398/66; 398/68; 398/45; 398/57

(58) Field of Classification Search ............ 398/45, 398/48–50, 57, 66, 68, 70, 78
See application file for complete search history.

(56) References Cited

U.S. PATENT DOCUMENTS

| | | | |
|---|---|---|---|
| 5,113,459 A | 5/1992 | Grasso et al. ............ 385/24 |
| 5,189,541 A | 2/1993 | Konishi ............ 359/118 |
| 5,287,211 A | 2/1994 | Grimes et al. ............ 359/161 |
| 5,303,207 A | 4/1994 | Brady et al. ............ 367/134 |
| 5,351,146 A * | 9/1994 | Chan et al. ............ 398/58 |
| 5,559,625 A | 9/1996 | Smith et al. ............ 359/125 |
| 5,847,852 A | 12/1998 | Domon et al. ............ 359/118 |
| 6,239,888 B1 | 5/2001 | Willebrand ............ 359/118 |
| 6,567,429 B1 * | 5/2003 | DeMartino ............ 370/539 |
| 2004/0208552 A1 * | 10/2004 | Harney et al. ............ 398/51 |

* cited by examiner

*Primary Examiner*—Dalzid Singh
(74) *Attorney, Agent, or Firm*—Thelen Reid Brown Raysman & Steiner LLP; David B. Ritchie

(57) ABSTRACT

An optical fiber system is provided which allows customers to access the system at points between huts (facilities where regional optical fiber cables are available for connection). A long-haul optical fiber system may be disposed between a first long-haul node and a second long-haul node. A regional optical fiber may then be disposed between the first long-haul node and the second long-haul node, and may have an access point at a hut disposed between the first long-haul node and the second long-haul node. An access optical fiber may be disposed between the first node and the second node and may have an access point at the hut, as well as at one or more points between the hut and the first long-haul node. The access optical fiber and the regional optical fiber may be coupled to a switch at the hut.

43 Claims, 5 Drawing Sheets

Clearstream - 001

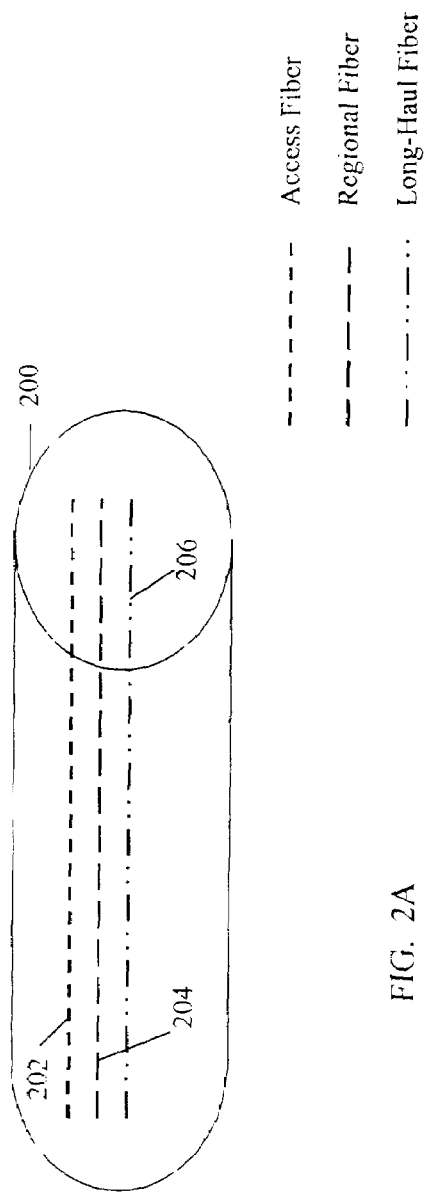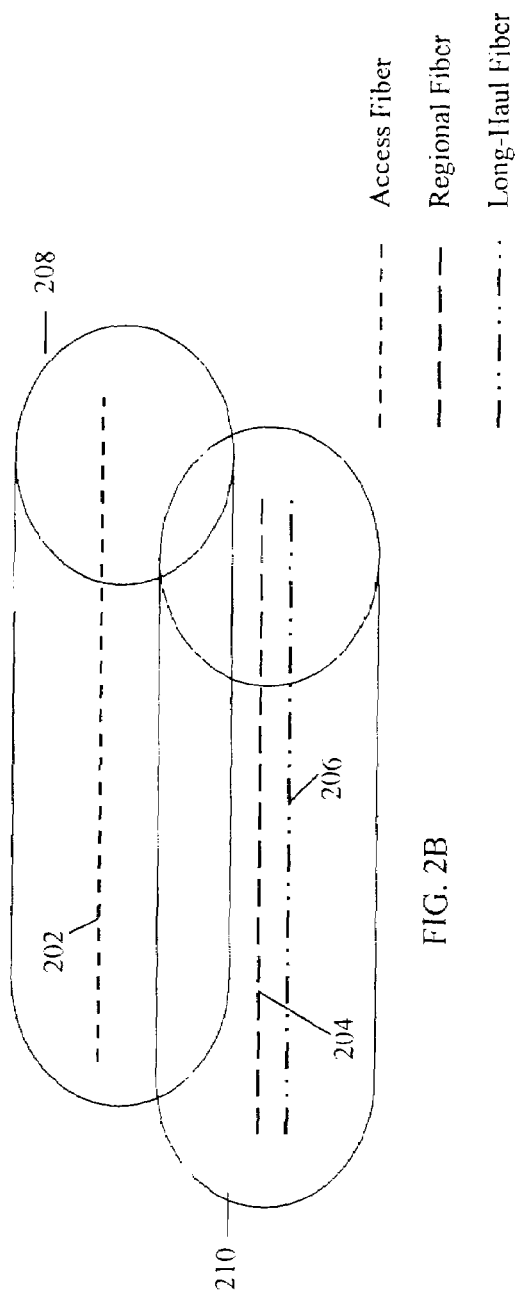
FIG. 2A
FIG. 2B

FIBEROPTIC DATA TELECOMMUNICATION SYSTEM ARCHITECTURE

FIELD OF THE INVENTION

The present invention relates to an arrangement of optical fibers within one or more assemblies and conduits. More particularly, the present invention relates to an arrangement of optical fibers to directly couple a local network to a larger network such as a wide area network (WAN) or metropolitan area network (MAN).

BACKGROUND OF THE INVENTION

At present, large amounts of information in the form of digital data are transmitted worldwide around the clock between and among computers and other data telecommunications equipment. Much of the data is transmitted over optical infrastructures, including optical fibers operated by companies known as telecommunications or data communication "carriers". It is the local, regional, national and international interconnection of these carriers that form and facilitate global telecommunications networks such as the Internet.

Generally, however, the presently deployed optical networks of regional and national carriers, in terrestrial and underwater environments, provide transmit and receive connectivity to such wide area networks only at relatively large cities and certain other specific locations. Generally, such optical networks do not provide direct customer access except at those specific locations. Since customers can only access the wide area optical network at certain hub locations such as the large cities, the number of customers who can gain direct access to the network at such hub locations is necessarily limited.

Thus, there is a need for a solution that provides direct customer access to such wide area networks at more locations along the optical fibers without significantly impacting the transmission of data over large distances.

BRIEF DESCRIPTION OF THE INVENTION

An optical fiber system is provided which allows customers to access the system at points between huts (facilities where regional optical fiber cables are available for connection). A long-haul optical fiber system may be disposed between a first long-e haul node and a second long-haul node. A regional optical fiber may then be disposed between the first long-haul node and the second long-haul node, and may have an access point at a hut disposed between the first long-haul node and the second long-haul node. An access optical fiber may be disposed between the first node and the second node and may have an access point at the hut, as well as at one or more points between the hut and the first long-haul node. The access optical fiber and the regional optical fiber may be coupled to a switch at the hut.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIGS. 2A and 2B are block diagrams illustrating optical fiber cable in accordance with embodiments of the present invention.

DETAILED DESCRIPTION

Embodiments of the present invention are described herein in the context of a fiberoptic data telecommunication system architecture. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The present invention provides for a logical and physical arrangement of optical fiber cables (into an optical fiber cable assembly) and networking devices, called a linear aggregation, that allow customers access at a number of locations along the length of the optical fiber cable assembly. The linear aggregation of optical fiber cables couples a local network to a wide area network. It provides local access for customer data or information at relatively closely spaced connectivity access points (CAPs) along the optical fiber cable assembly and provides for data transport via the CAPs to local, regional and larger networks.

Figure 1:
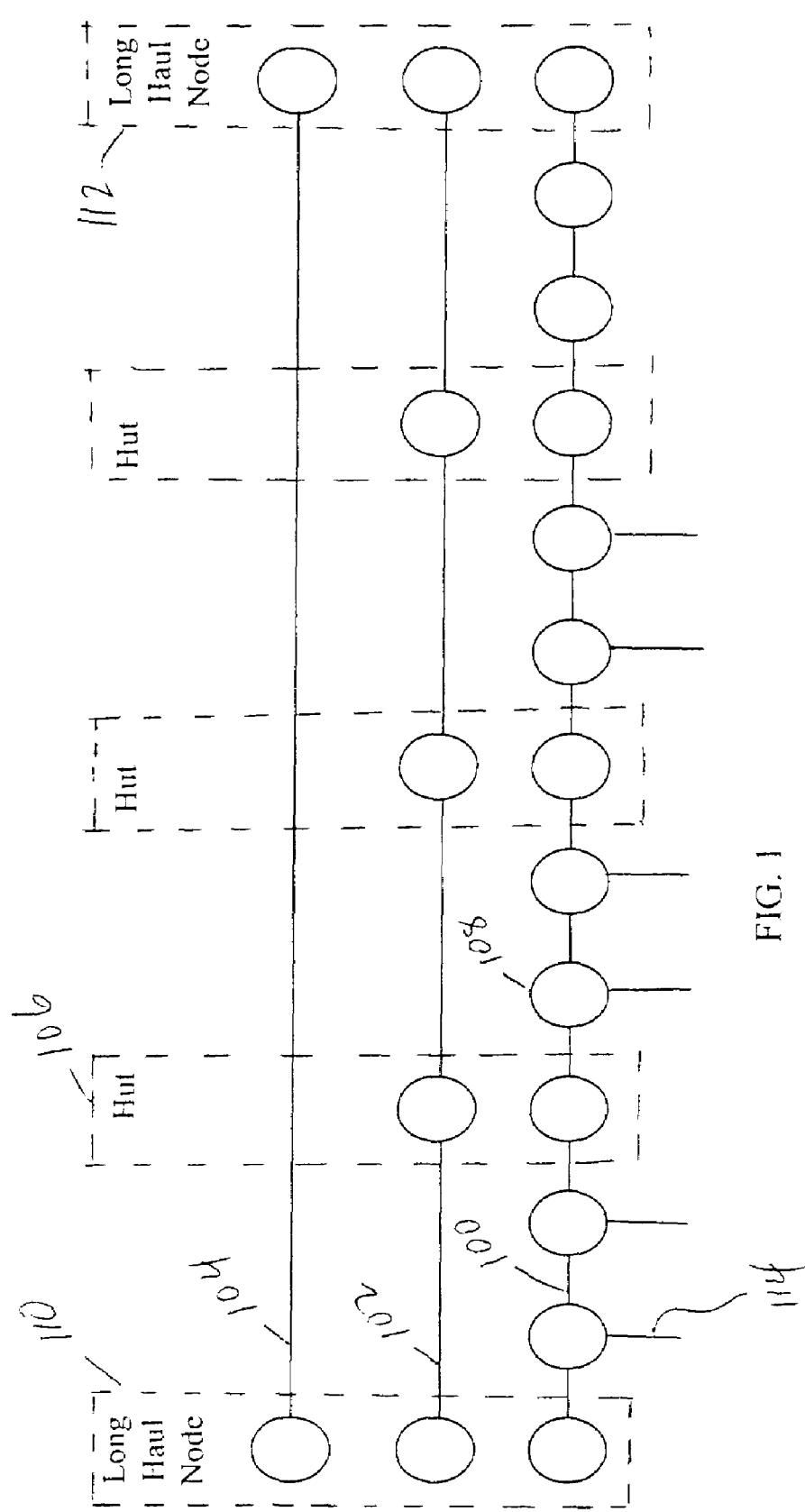
FIG. 1 is a block diagram illustrating an optical fiber system in accordance with an embodiment of the present invention.

FIG. 1 is a block diagram illustrating an optical fiber system in accordance with an embodiment of the present invention. At least three types of optical fibers are used in this system: an access optical fiber 100, a regional optical fiber 102, and a long-haul optical fiber 104. An access optical fiber couples a hut 106 to at least one connectivity access point (CAP) 108. A hut is a physical location that contains some capability to switch data between an access optical fiber 100 and a regional optical fiber 102. A CAP allows a customer to transmit and/or receive data on the access optical fiber 100. Each CAP may be provided with extra access optical fibers, such that there is sufficient fiber to connect customer premises equipment (CPE) or an aggregation point in-line (discussed in greater detail below). A long-haul optical fiber 104 connects two long-haul nodes 110, 112. A long-haul optical fiber 104 passes through one or more huts 106 (along with the other fibers in the optical fiber cable assembly which have endpoints at that hut), but only has end points at the long-haul nodes. A long-haul node is also a hut, in that it provides some capability to switch data between an access optical fiber 100 and a regional optical fiber 102, however, a long-haul node additionally provides some capability to switch data to and from the long-haul optical fiber 104 as well.

Access optical fibers 100 are coupleable to user optical fibers 114 at each of the CAPs. Additionally, each access optical fiber 100 is generally accessible at a hut. Generally accessible means that various devices can be connected to the fiber at that point. Thus, each access optical fiber 100 has an endpoint at a hut. Furthermore, each regional optical fiber 102 is generally accessible at a hut, in that each has an endpoint at a hut. Each long-haul optical fiber 104 is generally accessible only at a long-haul node 110, 112 because it only has endpoints at long-haul nodes and not at huts (or CAPs).

FIGS. 2A and 2B are block diagrams illustrating optical fiber cable in accordance with various embodiments of the present invention. The cable 200 contains an access optical fiber 202, a regional optical fiber 204, and a long-haul optical fiber 206. The fibers may be contained in the same fiber bundle or cable 200 as shown in FIG. 2A or the fibers may be housed in multiple or separate fiber bundles or cables 208, 210 as shown in FIG. 2B. The term "cable" will be used throughout the specification to describe the use of one or more bundles or conduits. Those of ordinary skill in the art will now realize that there are many different ways to arrange the fibers within one or several cable bundles or conduits.

Access optical fiber 202 provides customers or customers with local access to the fiber optical cable network. The access optical fiber 202 may be coupled to each CAP and terminate at the huts. The access optical fiber 202 receives customer information or data and transports the data to the corresponding hut.

Regional optical fiber 204 may pass uninterrupted through each CAP and extend from hut to hut. Data having a destination within the same region, but not the same local area, as the hut will be switched from the access optical fiber 202 to the regional optical fiber 204 at the hut.

Long-haul optical fiber 206 may pass uninterrupted through the CAPs and some huts. The long-haul optical fiber 206 may not optically terminate at each hut, but may physically pass uninterrupted through some huts. Some implementations are possible, however, where the long-haul optical fiber does not terminate at a hut for switching purposes, but does terminate at that hut for other purposes, such as amplification. Data having a destination outside the region of the hut may be switched from the access optical fiber 202 to the long-haul optical fiber 206 or from the regional optical fiber 204 to the long-haul optical fiber 206 at the hut.

Figure 3:
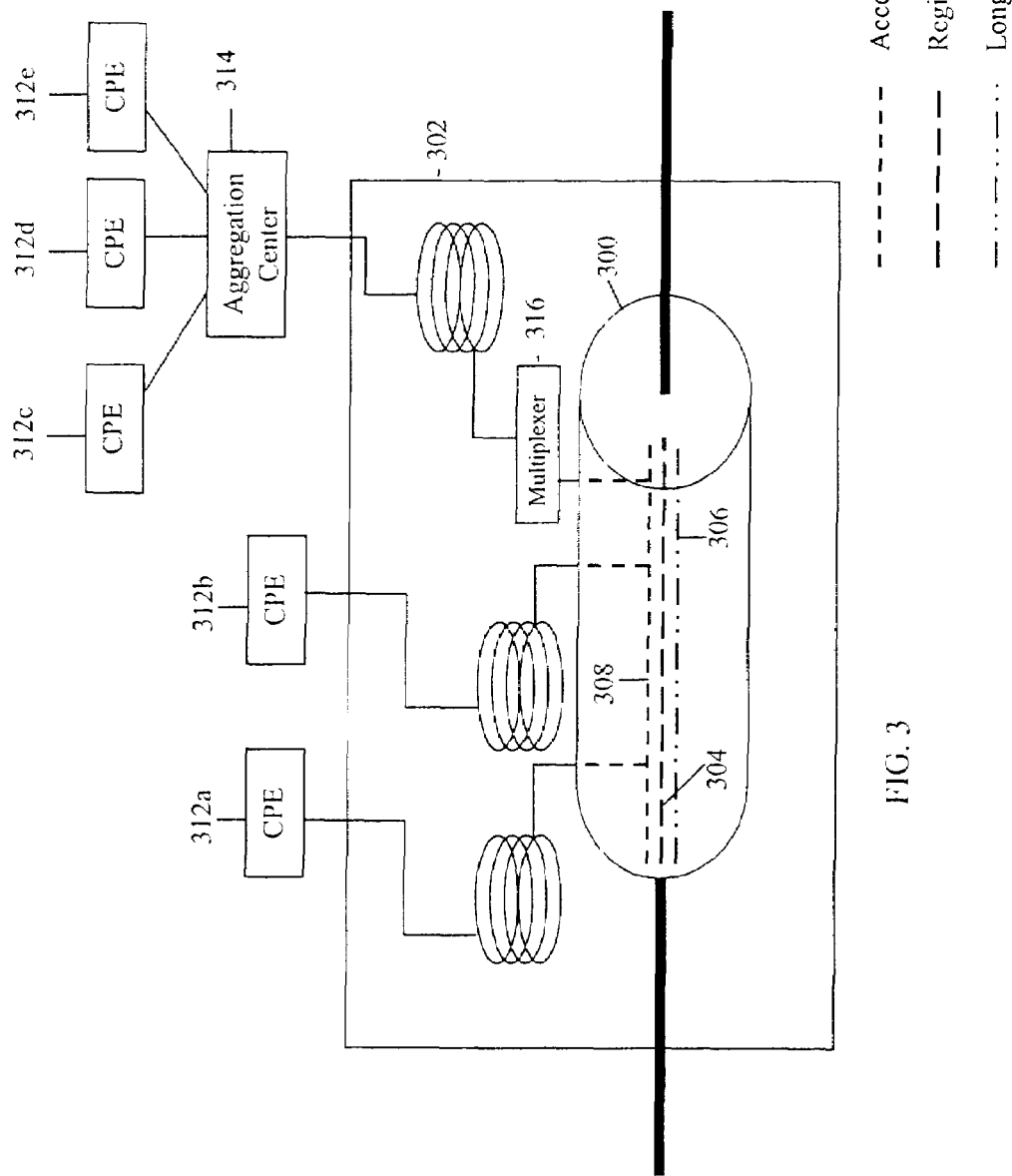
FIG. 3 is a block diagram illustrating a connection to a CAP in accordance with an embodiment of the present invention.

FIG. 3 is a block diagram illustrating a connection to a CAP in accordance with a specific embodiment of the present invention. The cable 300 may enter and exit the CAP 302 with the regional optical fiber 304 and the long-haul optical fiber 306 passing uninterrupted through the CAP 302. However, the access optical fiber 308 may be connected to a CPE 312a, 312b with the CPE 312a, 312b in-line with the access optical fiber 308 or it may be connected to an aggregation center 314 (also in-line with the access optical fiber 308), where data from multiple customer sites 312c, 312d, 312e is aggregated. Such aggregated data may then be multiplexed at a multiplexor 316 at the CAP. The customer's data would be transported directly on the access optical fiber 308. However, if connection is made to an aggregation center 314, data from multiple customers 312c, 312d, 312e may be multiplexed onto the same access optical fiber using, for example, a multiplexer 31S.

Figure 4:
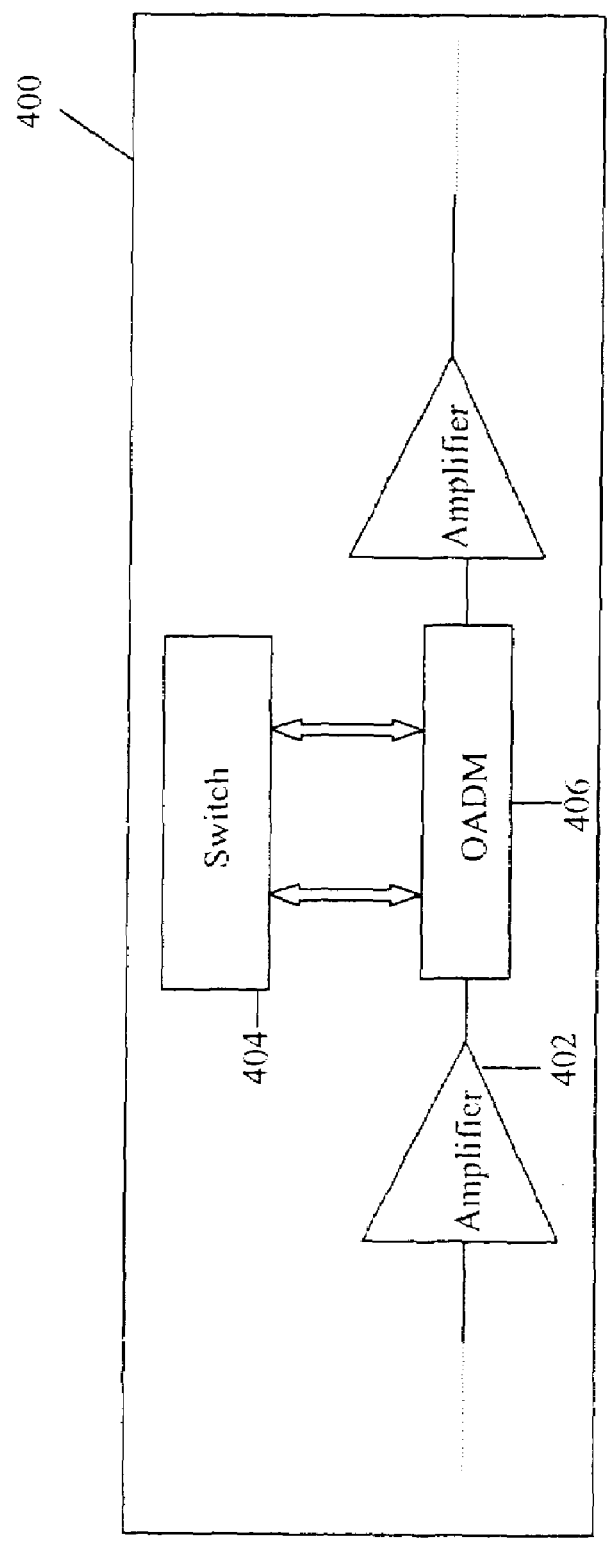
FIG. 4 a block diagram illustrating connections to a hut in accordance with an embodiment of the present invention.

FIG. 4 is a block diagram illustrating connections to a hut in accordance with one embodiment of the present invention. The hut 400 may house equipment such as amplifiers 402, which boost the optical signals in the fiber, and a switch 404, which may include facilities to convert electrical signals to optical signals and vice versa, determine the destination address of the data, and forward it to the appropriate location. Switch 404 may be, for example, an Ethernet aggregation switch maintaining a non-blocking status. A non-blocking status is one that ensures that the amount of data presented to the switch never exceeds the capacity of the switch. Each switch may function to provide standards-based layer 2 switching between CAPs connected to the switch. Where data is to be transmitted from a CAP to another hut, switch 404 may act as a statistical multiplexor of the data originating from several CAPs. Multiplexed data may then be switched based on its destination address.

Due to the various anomalies to which the optical signals are inevitably subjected along the optical fiber cable, amplifier 402 may restore the optical signal to or near to its original level. An optical add/drop mutiplexor (OADM) 406 may transform the individually amplified optical wavelengths into discrete communication channels which can be transmitted in a photonic state to the switch 404.

The switch 404, therefore, may transform the photons transmitted from the OADM 406 into electrical signals. The electrical signals may be assembled back into the form in which the data was originally transmitted by the customer and destination address of the data can then be ascertained. Once the destination address is ascertained, the electrical signal may then be converted back to optical signal by the switch 404 to be transported along one of the fibers to the desired destination.

Data on an access, regional, or long haul fiber having a destination within the same local location as the hut will remain on the access optical fiber for delivery via the local CAP. Data on an access optical fiber having a destination within the same region, but not the same local area, as the hut may be placed on the regional optical fiber for faster and more efficient delivery of the data since regional optical fibers continue uninterrupted through each CAP. Once the data reaches the proper hut, the switch in that hut may then forward the data to the local access optical fiber for delivery via the local CAP. Data on an access optical fiber having a destination outside the region of the hut is placed on the long-haul optical fiber for delivery to the proper hut. Once the data reaches the proper hut, the switch in that Hut may then forward the data from the long-haul optical fiber to the local access optical fiber or regional optical fiber for delivery via the proper local CAP.

In one embodiment of the present invention, switching may be accomplished using the Transmission Control Protocol/Internet Protocol (TCP/IP), with the transmission of optical signals on the individual optical fibers accomplished using the Synchronous Optical Network (SONET) protocol, or a suitable alternative. However, one of ordinary skill in the art would recognize that embodiments using other protocols and technologies are possible.

Figure 5:
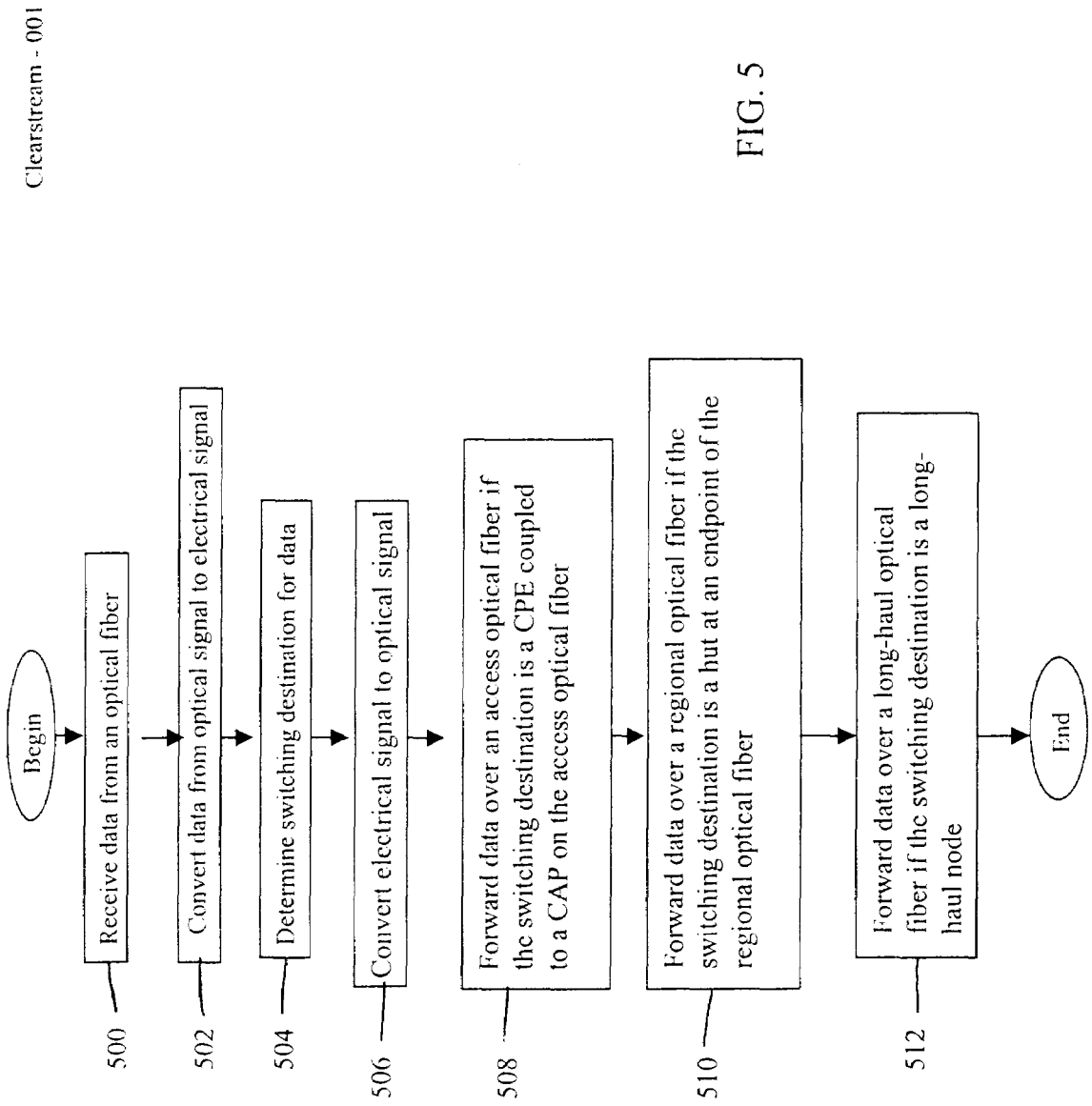
FIG. 5 is a flow diagram illustrating a method for operating a fiberoptic network at a hut in accordance with an embodiment of the present invention.

FIG. 5 is a flow diagram illustrating a method for operating a fiberoptic network in a hut in accordance with a specific embodiment of the present invention. At 500, data may be received from an optical fiber. At 502, the data may be converted from an optical signal to an electrical signal. This is optional as it is also possible to utilize an optical switch, which would not require the conversion of the optical signal to an electrical signal before switching. At 504, a switching destination is determined for the data. Typically this may involve examining a destination address in the data, as is common in IP. However, implementations are possible where the destination address in the data is not necessarily the best place to next forward the data. For example, if the destination address is at a CPE accessible from a long-haul node, but the long-haul optical fiber leading to that long-haul node is congested or non-functioning, it may be better to first forward the data to a hop in the form of a hut reachable through a regional optical fiber.

At 506, the data may be converted from an electrical signal back to an optical signal. Again, this is optional and is not necessary if an optical switch is used. At 508, the data may be forwarded over an access optical fiber if the switching destination is a CPE coupled to a CAP on the access optical fiber. At 510, the data may be forwarded over a regional optical fiber if the switching destination is a hut at an endpoint of the regional optical fiber. If this method is being performed by a long-haul node, then at 512 the data may be forwarded over a long-haul optical fiber if the switching destination is a long-haul node at an endpoint of the long-haul optical fiber.

The present invention has been described as access optical fibers providing customers with local access, regional optical fibers providing customers with regional access, and long-haul optical fibers providing customers to access outside the customer's region. However, it will now be known to those of ordinary skill in the art that the access each fiber allows may differ. For example, regional optical fibers may provide local access, long-haul optical fibers may provide local access, and access optical fibers may provide for access outside the customer's region. Thus, the access area for each fiber is not meant to be limiting. Moreover, those of ordinary skill in the art will now realize that the number of fibers used to service different areas are not meant to be limiting. For example, an ultra-long haul fiber may be included in the fiber optical cable to service areas that the long haul fibers do not service, for example, outside the United States or another continent. Thus the present invention should not be limited to an embodiment with exactly three types of fibers used.

As optical switching becomes available, the present invention may be modified to efficiently utilize such technologies, which has the capability to further enhance the data transmission capabilities of the fiberoptic cable assembly system as it will provide for the use of optical signals entirely across its length. Thus, the present invention should be construed so as to cover such new technologies.

While embodiments and applications of this invention have been shown and described, it would be apparent to those skilled in the art having the benefit of this departing that many more modifications than mentioned above are possible without departing from the inventive concepts herein. The invention, therefore, is not to be restricted except in the spirit of the appended claims.

What is claimed is:

1. An optical fiber system, comprising:
   a long-haul optical fiber disposed between a first long-haul node and a second long-haul node;
   a regional optical fiber disposed between said first long-haul node and said second long-haul node and having a regional access point at a hut disposed between said first long-haul node and said second long-haul node;
   an access optical fiber disposed between said first long-haul node and said second long-haul node and having a local access point at said hut and at a point between said hut and said first long-haul node;
   wherein each of said long-haul optical fiber, said regional optical fiber, and said access optical fiber are generally accessible at said first long-haul node and said second long-haul node;
   wherein said regional optical fiber is generally accessible at said hut;
   wherein said access optical fiber is coupleable to a customer premises equipment (CPE) at said point between said hut and said first long-haul node; and
   wherein said access optical fiber and said regional optical fiber are coupled to different ports of a switch at said hut.

2. The optical fiber system of claim 1, wherein said access optical fiber, said regional optical fiber, and said long-haul optical fiber are coupled to different ports of a switch at a long-haul node.

3. The optical fiber system of claim 1, wherein said switch is an Ethernet switch.

4. A method for operating a fiberoptic network at a hut, comprising:
   receiving data from an access optical fiber disposed between a first long-haul node and a second long-haul node and having a local access point at said hut and at a point between said hut and said first long-haul node;
   determining a switching destination for said data;
   forwarding said data over said access optical fiber if said switching destination is a CPE on said access optical fiber; and
   forwarding said data over a regional optical fiber if said switching destination is a hut at an endpoint of said regional optical fiber, said regional optical fiber being disposed between said first long-haul node and said second long-haul node and having a regional access point at a hut disposed between said first long-haul node and said second long-haul node.

5. The method of claim 4, further comprising:
   forwarding said data over a long-haul optical fiber if said switching destination is a long-haul node at an endpoint of said long-haul optical fiber.

6. The method of claim 4, wherein said switching destination is a destination address.

7. The method of claim 4, further comprising converting said data from an access optical fiber to an electrical signal after said receiving.

8. The method of claim 7 further comprising converting said data to an optical signal before said forwarding.

9. A method for operating a fiberoptic network at a hut, comprising:
   receiving data from a regional optical fiber disposed between a first long-haul node and said second long-haul node and having a regional access point at a hut disposed between said first long-haul node and said second long-haul node;
   determining a switching destination for said data;
   forwarding said data over an access optical fiber if said switching destination is a CPE on said access optical fiber, said access optical fiber disposed between the first long-haul node and the second long-haul node and having a local access point at said hut and at a point between said hut and said first long-haul node; and
   forwarding said data over a regional optical fiber if said switching destination is a hut at an endpoint of said regional optical fiber, said regional optical fiber being disposed between said first long-haul node and said second long-haul node and having a regional access point at a hut disposed between said first long-haul node and said second long-haul node.

10. The method of claim 9, further comprising:
forwarding said data over a long-haul optical fiber if said switching destination is a long-haul node at an endpoint of said long-haul optical fiber.

11. The method of claim 9, wherein said switching destination is a destination address.

12. The method of claim 9, further comprising converting said data from an access optical fiber to an electrical signal after said receiving.

13. The method of claim 12 further comprising converting said data to an optical signal before said forwarding.

14. A method for operating a fiberoptic network at a hut, comprising:
receiving data from a long-haul optical fiber disposed between a first long-haul node and a second long-haul node;
determining a switching destination for said data;
forwarding said data over an access optical fiber if said switching destination is a CPE on said access optical fiber, said access optical fiber disposed between the first long-haul node and the second long-haul node and having a local access point at said hut and at a point between said hut and said first long-haul node; and
forwarding said data over a regional optical fiber if said switching destination is a hut at an endpoint of said regional optical fiber, said regional optical fiber being disposed between said first long-haul node and said second long-haul node and having a regional access point at a hut disposed between said first long-haul node and said second long-haul node.

15. The method of claim 14, further comprising:
forwarding said data over a long-haul optical fiber if said switching destination is a long-haul node at an endpoint of said long-haul optical fiber.

16. The method of claim 14, wherein said switching destination is a destination address.

17. The method of claim 14, further comprising converting said data from an access optical fiber to an electrical signal after said receiving.

18. The method of claim 17 further comprising converting said data to an optical signal before said forwarding.

19. An optical fiber system, comprising:
a long-haul optical fiber disposed between a first long-haul node and a second long-haul node;
a regional optical fiber disposed between said first long-haul node and said second long-haul node and having a regional access point at a first hut disposed between said first long-haul node and said second long-haul node;
an access optical fiber disposed between said first long-haul node and said second long-haul node and having a local access point at said hut and at a point between said first hut and said first long-haul node;
wherein each of said long-haul optical fiber, said regional optical fiber, and said access optical fiber are generally accessible at said first long-haul node and said second long-haul node;
wherein said regional optical fiber is generally accessible at said first hut;
wherein said access optical fiber is coupleable to a CPE at said point between said first hut and said first long-haul node; and
wherein said access optical fiber and said regional optical fiber are coupled to different ports of a switch at said hut, wherein said switch is designed to receive data from an optical fiber, determine a switching destination for said data, forward said data to said access optical fiber if said switching destination is a CPE coupled to said point between said hut and said first long-haul node, and forward said data over said regional optical fiber if said switching destination is a second hut at an endpoint of said regional optical fiber.

20. The optical fiber system of claim 19, wherein said access optical fiber, said regional optical fiber, and said long-haul optical fiber are coupled to different ports of a switch at a long-haul node.

21. The optical fiber system of claim 19, wherein said switch is an Ethernet switch.

22. The optical fiber system of claim 19, wherein said switch is further designed to forward said data over a long-haul optical fiber if said switching destination is a long-haul node at an endpoint of said long-haul optical fiber.

23. The optical fiber system of claim 19, wherein said switching destination is a destination address.

24. The optical fiber system of claim 19, wherein said switch is further designed to convert said data from an access optical fiber to an electrical signal after said receiving.

25. The optical fiber system of claim 24, wherein said switch is further designed to convert said data to an optical signal before said forwarding.

26. An apparatus for operating a fiberoptic network at a hut, comprising:
means for receiving data from an access optical fiber disposed between a first long-haul node and a second long-haul node and having a local access point at said hut and at a point between said hut and said first long-haul node;
means for determining a switching destination for said data;
means for forwarding said data over said access optical fiber if said switching destination is a CPE on said access optical fiber; and
means for forwarding said data over a regional optical fiber if said switching destination is a hut at an endpoint of said regional optical fiber, said regional optical fiber being disposed between said first long-haul node and said second long-haul node and having a regional access point at a hut disposed between said first long-haul node and said second long-haul node.

27. The apparatus of claim 26, further comprising:
means for forwarding said data over a long-haul optical fiber if said switching destination is a long-haul node at an endpoint of said long-haul optical fiber.

28. The apparatus of claim 26, wherein said switching destination is a destination address.

29. The apparatus of claim 26, further comprising means for converting said data from an access optical fiber to an electrical signal after said receiving.

30. The apparatus of claim 29 further comprising means for converting said data to an optical signal before said forwarding.

31. An apparatus for operating a fiberoptic network at a hut, comprising:
means for receiving data from a regional optical fiber disposed between a first long-haul node and said second long-haul node and having a regional access point at a hut disposed between said first long-haul node and said second long-haul node;

means for determining a switching destination for said data;

means for forwarding said data over an access optical fiber if said switching destination is a CPE on said access optical fiber, said access optical fiber disposed between the first long-haul node and the second long-haul node and having a local access point at said hut and at a point between said hut and said first long-haul node; and means for forwarding said data over a regional optical fiber if said switching destination is a hut at an endpoint of said regional optical fiber, said regional optical fiber being disposed between said first long-haul node and said second long-haul node and having a regional access point at a hut disposed between said first long-haul node and said second long-haul node.

32. The apparatus of claim 31, further comprising:
means for forwarding said data over a long-haul optical fiber if said switching destination is a long-haul node at an endpoint of said long-haul optical fiber.

33. The apparatus of claim 31, wherein said switching destination is a destination address.

34. The apparatus of claim 31, further comprising means for converting said data from an access optical fiber to an electrical signal after said receiving.

35. The apparatus of claim 34 further comprising means for converting said data to an optical signal before said forwarding.

36. An apparatus for operating a fiberoptic network at a hut, comprising:
means for receiving data from a long-haul optical fiber disposed between a first long-haul node and a second long-haul node;

means for determining a switching destination for said data;

means for forwarding said data over an access optical fiber if said switching destination is a CPE on said access optical fiber, said access optical fiber disposed between the first long-haul node and the second long-haul node and having a local access point at said hut and at a point between said hut and said first long-haul node; and means for forwarding said data over a regional optical fiber if said switching destination is a hut at an endpoint of said regional optical fiber, said regional optical fiber being disposed between said first long-haul node and said second long-haul node and having a regional access point at a hut disposed between said first long-haul node and said second long-haul node.

37. The apparatus of claim 36, further comprising:
means for forwarding said data over a long-haul optical fiber if said switching destination is a long-haul node at an endpoint of said long-haul optical fiber.

38. The apparatus of claim 36, wherein said switching destination is a destination address.

39. The apparatus of claim 36, further comprising converting means for said data from an access optical fiber to an electrical signal after said receiving.

40. The apparatus of claim 39 further comprising means for converting said data to an optical signal before said forwarding.

41. A program storage device readable by a machine, tangibly embodying a program of instructions executable by the machine to perform a method for operating a fiberoptic network at a hut, the method comprising:
receiving data from an access optical fiber disposed between a first long-haul node and a second long-haul node and having a local access point at said hut and at a point between said hut and said first long-haul node;

determining a switching destination for said data;

forwarding said data over said access optical fiber if said switching destination is a connectivity access point on said access optical fiber; and forwarding said data over a regional optical fiber if said switching destination is a hut at an endpoint of said regional optical fiber, said regional optical fiber being disposed between said first long-haul node and said second long-haul node and having a regional access point at a hut disposed between said first long-haul node and said second long-haul node.

42. A program storage device readable by a machine, tangibly embodying a program of instructions executable by the machine to perform a method for operating a fiberoptic network at a hut, the method comprising:
receiving data from a regional optical fiber disposed between a first long-haul node and said second long-haul node and having a regional access point at a hut disposed between said first long-haul node and said second long-haul node;

determining a switching destination for said data;

forwarding said data over an access optical fiber if said switching destination is a CPE on said access optical fiber, said access optical fiber disposed between the first long-haul node and the second long-haul node and having a local access point at said hut and at a point between said hut and said first long-haul node; and forwarding said data over a regional optical fiber if said switching destination is a hut at an endpoint of said regional optical fiber, said regional optical fiber being disposed between said first long-haul node and said second long-haul node and having a regional access point at a hut disposed between said first long-haul node and said second long-haul node.

43. A program storage device readable by a machine, tangibly embodying a program of instructions executable by the machine to perform a method for operating a fiberoptic network at a hut, the method comprising:
receiving data from a long-haul optical fiber disposed between a first long-haul node and a second long-haul node;

determining a switching destination for said data;

forwarding said data over an access optical fiber if said switching destination is a CPE on said access optical fiber, said access optical fiber disposed between the first long-haul node and the second long-haul node and having a local access point at said hut and at a point between said hut and said first long-haul node; and forwarding said data over a regional optical fiber if said switching destination is a hut at an endpoint of said regional optical fiber, said regional optical fiber being disposed between said first long-haul node and said second long-haul node and having a regional access point at a hut disposed between said first long-haul node and said second long-haul node.

* * * * *